Dec. 20, 1955   L. W. SCHOPPEE   2,727,345
HEAT SEALING DEVICE
Filed March 26, 1952   2 Sheets-Sheet 1
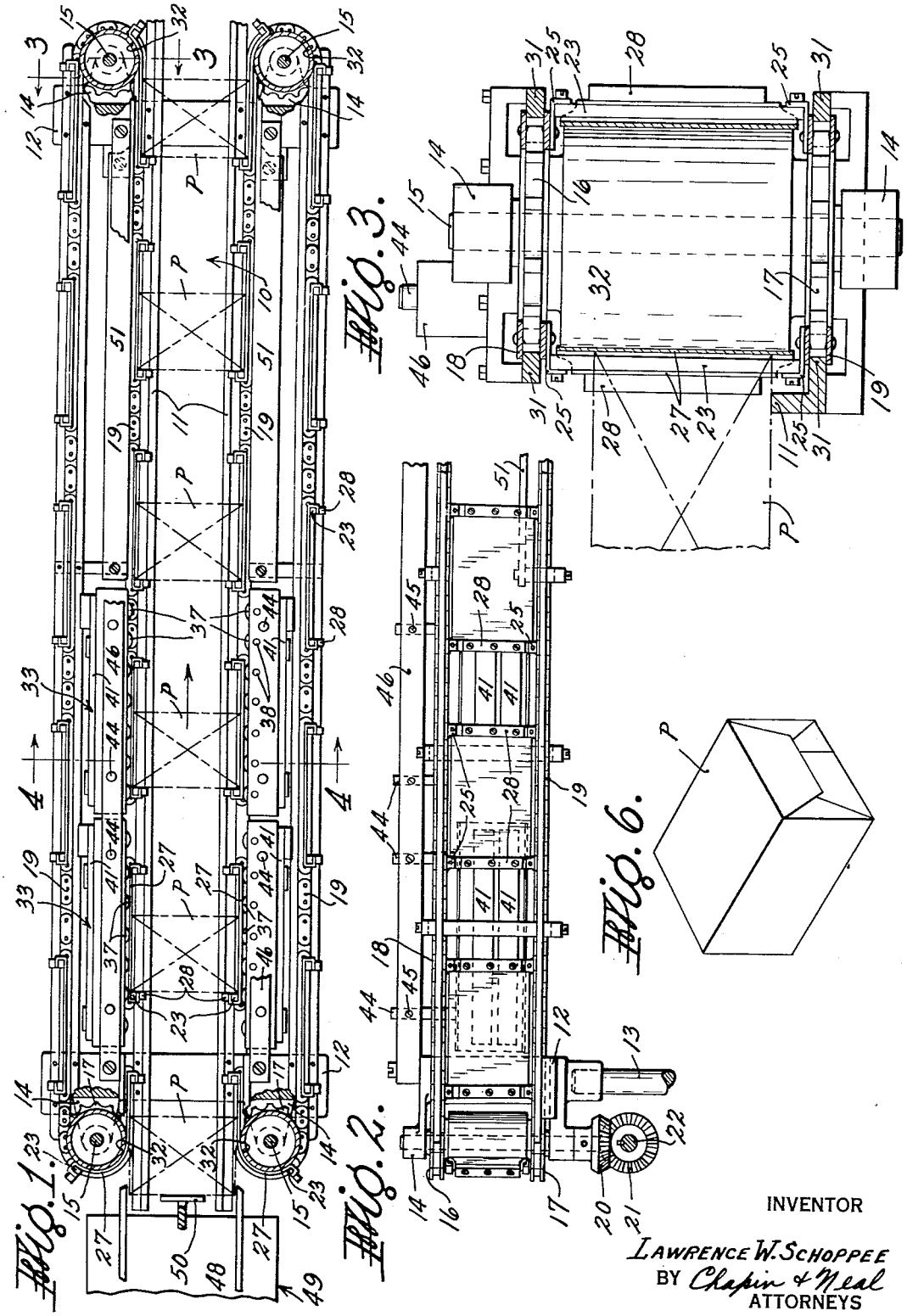
INVENTOR
LAWRENCE W. SCHOPPEE
BY Chapin & Neal
ATTORNEYS Dec. 20, 1955 — L. W. SCHOPPEE — 2,727,345
HEAT SEALING DEVICE
Filed March 26, 1952 — 2 Sheets—Sheet 2
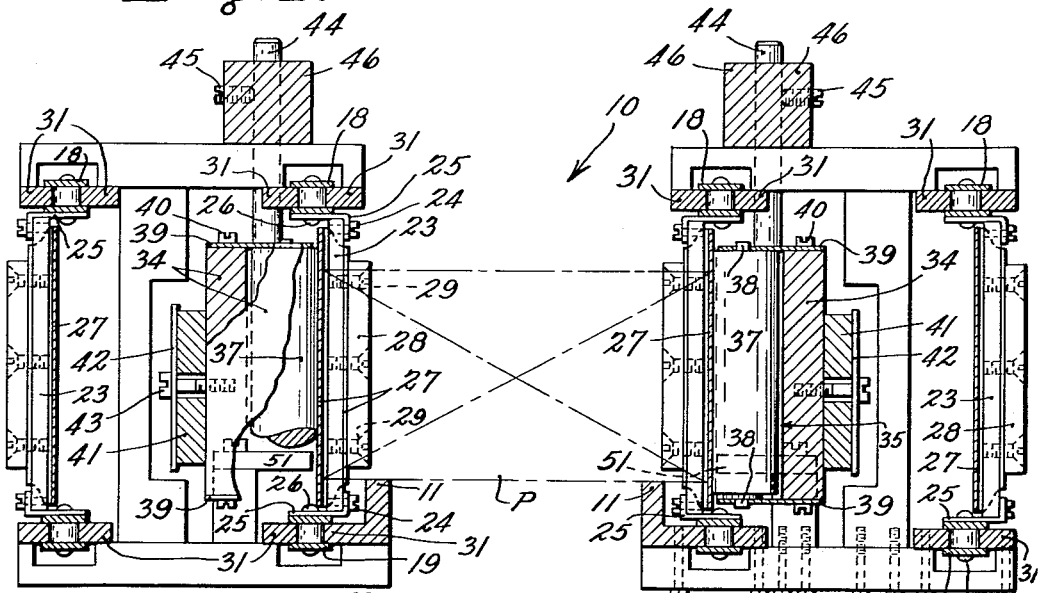
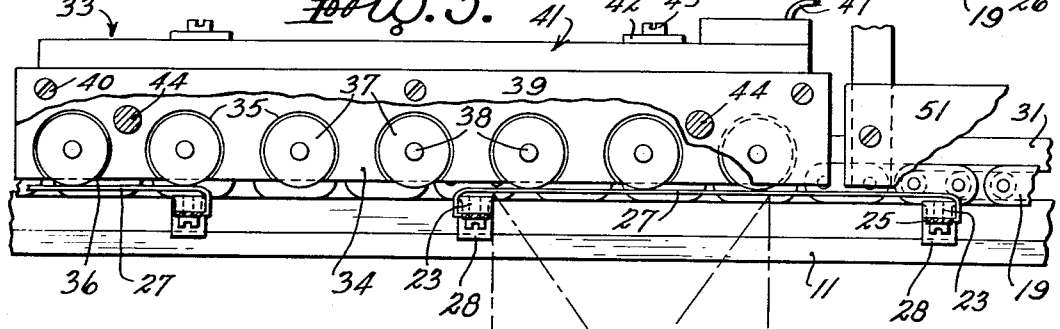
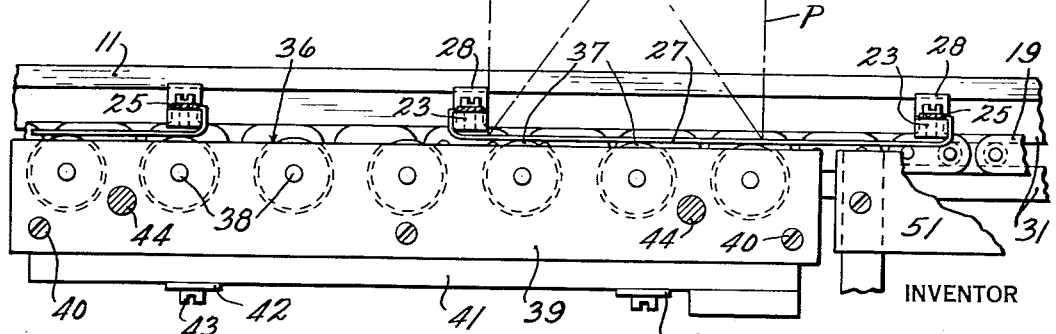
INVENTOR
LAWRENCE W. SCHOPPEE
BY Chapin & Neal
ATTORNEYS

United States Patent Office 2,727,345
Patented Dec. 20, 1955

2,727,345

HEAT SEALING DEVICE

Lawrence W. Schoppee, Springfield, Mass., assignor to Package Machinery Company, East Longmeadow, Mass., a corporation of Massachusetts Application March 26, 1952, Serial No. 278,622

6 Claims. (Cl. 53—154)

This invention relates to an improvement in heat sealing devices for sealing wrappers at the ends of wrapped articles or packages and for similar purposes. More particularly it relates to improvements in sealers of that class in which the packages or articles are advanced between members which move with the article, heat being applied through the members to the overlapping portions of the wrapper or other covering on the package.

One object is to provide a structure which will operate on various types of wrapping or covering material including synthetic plastic materials such as polyvinyl chloride, rubber hydrochloride and the like, as well as materials with short plastic ranges such as polyethylene.

Another object of the invention is to provide a more positive control of the article by the moving members and an improved means for maintaining the wrapper in position during the sealing.

A further object is to provide a structure which is adapted to receive the articles or packages directly from the wrapping or packaging machine and which will operate on a range of sizes of articles or packages.

Other and further objects residing in the details of construction will be made apparent from the following specification and claims in the disclosure of the drawings.

In the accompanying drawings which illustrate one embodiment of the invention,

Fig. 1 is a top plan view, parts being broken away;

Fig. 2 is a fragmentary side elevational view;

Fig. 3 is a sectional view substantially on line 3—3 of Fig. 1 but on a larger scale;

Fig. 4 is a sectional view substantially on line 4—4 of Fig. 1 but on a larger scale;

Fig. 5 is a fragmentary plan view parts being broken away; and

Fig. 6 is a generally perspective view of one form of package.

Referring to the drawings, 10 indicates the sealing channel generally, which includes spaced rails 11 which support the packages as they are moved through the channel. The rails 11 are supported by cross members 12 at the ends of the channel 10, the cross members 12 being supported on standards, one of which is shown at 13 in Fig. 2.

At the ends of cross members 12, outwardly of rails 11 are mounted brackets 14 in each of which is journaled a vertical shaft 15. Each shaft 15 carries vertically spaced upper and lower sprockets 16 and 17. Around each pair of upper sprockets 16 at opposite sides of the channel is trained an upper sprocket chain 18 and around each pair of lower sprockets 17 is trained a lower sprocket chain 19 providing opposed pairs of spaced chains. The shafts 15 at one end of the machine carry bevel gears 20 which mesh with bevel gears 21 splined or otherwise fixed on a cross shaft 22. Shaft 22 is driven from the power shaft of the wrapping machine being served by the sealer, or from any other suitable source of power, not shown, to advance the adjacent flights of the chains in the direction of the arrow in Fig. 1.

As best shown in Figs. 3, 4 and 5, a series of spaced vertical bars 23 extend between the upper and lower chains 18 and 19, the ends of the bars being connected by screws 24 to angle members 25 which replace corresponding link elements in each pair of chains, the link pivots being indicated at 26. Connected between successive pairs of the bars 23 are package engaging panels 27 of woven glass fibre or other suitable material, the ends of the panels being secured to the bars by clamping strips 28 held to the bars by screws 29. The ends of the panels are secured to sides of the bars facing the channel 10 and the panels extend around the outer sides and back of the bars, so that successive panels present unobstructed surfaces, outwardly of the channel, moving in a common plane. The upper and lower chains 18 and 19 run between spaced guide rails 31 which keep the chains and panels in line. The panels are not taut between the bars 23 so that they may flex to adjust themselves to package and wrapper irregularities, and assure proper contact with the heated members, later described.

The shafts 15 are each provided with a drum 32 positioned intermediate the sprockets 16—17 to guide and give support to the panels 27 as the chains which carry them travel around said sprockets. The drums also guide the packages as they are being discharged from the channel.

Adjacent the entrance of the channel and positioned to engage the sides of the panels 27 outwardly of the channel are a series of heater units generally indicated at 33. As best shown in Figs. 4 and 5 these heater units each comprise a metal block 34 formed with a plurality of vertical cylindrical bores 35 cut by the surface of the block to form segmental openings 36 at the channel face of the block. A metal roller 37 is positioned in each bore for free rotation in close proximity to the walls of the bore and with a portion of the roll extending outwardly of the opening 36 into rolling contact with the outer surface of the panels 27 as the latter travel along the channel.

The ends of rollers 37 are provided with stub shafts 38 journaled in openings formed in plates 39 secured to the upper and lower faces of blocks 34 as by screws 40. The block 34 and rollers 37 are heated by suitable heating elements such as cartridge type heaters or elongated electric heating elements, generally indicated at 41, of any suitable type, which are clamped to the outer faces of the blocks by clamp bars 42 and machine screws 43. The heating units are suspended by rods 44 extending upwardly from the blocks 34 and adjustably secured by set screws 45 in longitudinal frame members 46. Electric current is supplied to the heating elements 41 through conductor 47 from any suitable source, not shown.

As shown heater units are positioned only at the portion of the channel 10 adjacent the entrance, the balance of the channel being free from heat permits the softened sealable material to cool and set. The number of heater units employed will depend on the character and thickness of the material being sealed.

As shown in Fig. 1 the sealing device may be positioned adjacent the discharge channel 48 of any suitable form of wrapping or packaging machine, generally indicated at 49. The packages such as P are discharged by the discharge pushers 50 of the wrapping or packaging machine between the panels 27 of the sealer, the speed of chains 18—19 being preferably so timed with the wrapping machine that the rear vertical corners of the package are engaged by the bars 23 as the packages are disengaged by the pusher 50. Thereafter the packages are carried forward by the bars 23 with the panels 27 moving with and relatively stationary with respect to the ends of the package, as the outside of the panels are engaged by and pass over the heated rollers 37. The heat from the rolls is transmitted through the thin panels 27 to the overlapping end folds of the wrapper to cause a fusing of the fusible material of the wrapper and effect the sealing which is completed by the setting of the fused material during the passage of the packages through the unheated portion of the channel. In the unheated portion of the channel the panels are backed up by guide bars 51.

As the packages leave the channel they may be received on a suitable table or conveyor, not shown.

As will be understood the panels 27 are formed of a material to which the fusible sealing material on the package is non-adherent and prevent displacement of the wrapper folds during the sealing operation.

While the woven glass fibre above mentioned, is in general satisfactory for the panels with respect to most fusible wrapping materials it will be understood that other materials may be employed as may be found suitable or desirable.

What is claimed is:

1. In a sealing device, for sealing the end folds of wrapped packages and the like, having opposed pairs of spaced chains defining a sealing channel between the adjacent inner courses thereof, each pair of chains passing around spaced sprockets at the ends of the channel; a series of spaced thin, heat transmitting panels formed of pliantly flexible material and slackly mounted between supports carried by and bridging the two chains of each pair of chains, the panels carried by one pair of chains opposing the panels carried by the other pair of chains and making an overall conforming engagement with the opposite ends of a package in the channel, means carried by the chains at the trailing edges of the panels and extending inwardly of the channel to engage the trailing faces of the packages and advance the latter through the channel in fixed relation to the panels with the latter conformably engaging the ends of the packages, and heated members engaging the outer surfaces of the panels as the latter and the packages engaged thereby advance through the channel to apply sealing heat to the ends of the package engaged between the panels.

2. In a sealing device as recited in claim 1, drums positioned between the said pairs of sprockets to support said panels as the portions of the chains adjacent the edges of the panels round the sprockets.

3. A sealing device as recited in claim 1 in which the heated members engaging the outer surfaces of the panel are provided with segmental cylindrical recesses having anti-friction rollers mounted therein for free rotation.

4. A sealing device as recited in claim 1 in which the said panels have substantially the flexibility and heat transmitting characteristics of woven glass fibre.

5. In a sealing device, for sealing the end folds of wrapped packages and the like, having opposed pairs of spaced chains defining a sealing channel between the adjacent inner courses thereof, each pair of chains passing around spaced sprockets at the ends of the channel; successive pairs of spaced bars bridging the two chains of each pair of chains and connected at their ends to corresponding links of each pair of chains, sheets of thin, pliantly flexible, heat transmitting material respectively connected at their leading and trailing edges to the leading and trailing bars of said pairs of bars to form conformally slack, opposed panels to conformably engage the ends of packages in the channel, the trailing bar of each pair of bars extending inwardly of the channel to engage the trailing faces of the packages and advance the latter through the channel in fixed relation to the panels, and heated members positioned at the sides of the channel to apply sealing heat through said panels to the ends of the packages conformably engaged therebetween as the latter are moved through the channel.

6. A sealing device as recited in claim 5 in which the material of the panels have substantially the flexibility and heat transmitting characteristics of woven glass fibre.

References Cited in the file of this patent

UNITED STATES PATENTS

| 727,554 | Phillips | May 5, 1903 |
| 1,037,845 | Albee | Sept. 10, 1912 |
| 1,388,422 | Forsman | Aug. 23, 1921 |
| 1,854,075 | Smith et al. | Apr. 12, 1932 |
| 2,354,989 | Fusco | Aug. 1, 1944 |